Oct. 13, 1931.  H. ROSENBERG  1,827,615

FASTENER

Filed May 14, 1928

Inventor:
HEYMAN ROSENBERG
By Edgar M Kitchin
his Attorney.

Patented Oct. 13, 1931

1,827,615

UNITED STATES PATENT OFFICE

HEYMAN ROSENBERG, OF NEW YORK, N. Y.

FASTENER

Application filed May 14, 1928. Serial No. 277,607.

This invention relates to improvements in that type of fasteners commonly referred to as screw-threaded, and has as its essential object ease and accuracy of application.

In my co-pending application, Serial No. 124,454, filed July 23, 1926, since patented June 9, 1931, Patent No. 1,809,758 there is illustrated an effective means of anchorage adapted for and capable of ready and accurate application, but, owing to the fact that the root diameter in the structure shown in said application is constant to and including the pilot, it is necessary to advance the thread into the work initially by a combined axial and torsional stress, or, in other words, the screw must be rotated and pushed inward at the same time. This action is accomplished with considerably greater ease when utilizing the fastener shown in my said co-pending application than is accomplished with a similarly shaped fastener or screw having a thread of full depth throughout the length of the screw.

The present invention is directed to the production of an improvement in the type of screw shown in my said co-pending application to further enhance the ease, while preserving the precision, of application of the screw by largely obviating the necessity for the longitudinal thrust and by causing parts of the thread to take hold laterally of the work instead of depending upon a constant forward advance of the thread in the work as the initial mode of engagement. To this end, the invention comprises a pinlike body having a piloting tapering portion at its entering end and a thread tapering onto said tapering portion and blending into the same at the entering end of the thread, the fastener having a portion formed with a constant root diameter or cylindrical body and a full depth thread extending along said cylindrical body.

A further embodiment of the invention comprehends substantially the same combination in which the entering portion of the thread is grooved longitudinally with a gradually tapering groove which vanishes substantially at the beginning of the full depth thread.

A further detail of the invention includes the truncating of the cone formed by the tapering portion and the extension of such cone somewhat beyond the terminus of the thread.

Other objects in view will in part hereinafter be stated and in part become obvious.

In the accompanying drawings,—

Figure 1:
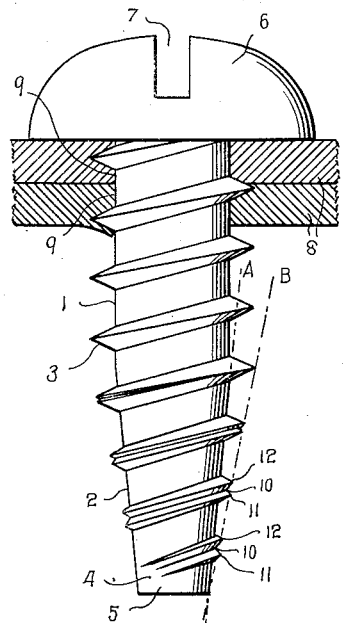
Figure 1 is a view in side elevation of a fastener embodying the features of the present invention, the work being seen in section illustrating the fastener in its finally seated position, and dot and dash lines being employed to indicate the relative inclination of the tapers of the screw thread and of the body portion, respectively.
Figure 2:
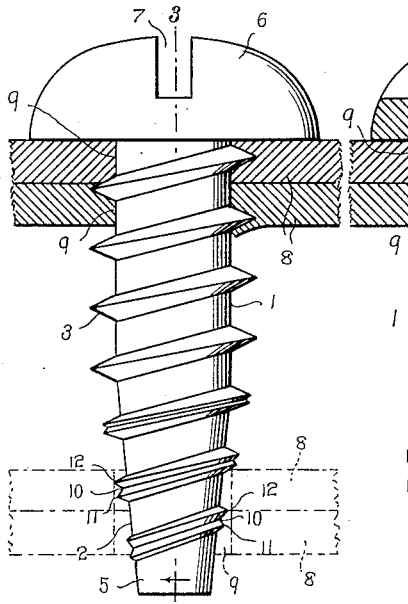
Figure 2 is a view similar to Figure 1 taken on a plane at right angles to the plane of observation of Figure 1, the work being shown in full lines in the final position of the parts and in dotted lines in the position of the initial introduction of the fastener before any driving action has been effected.
Figure 3:
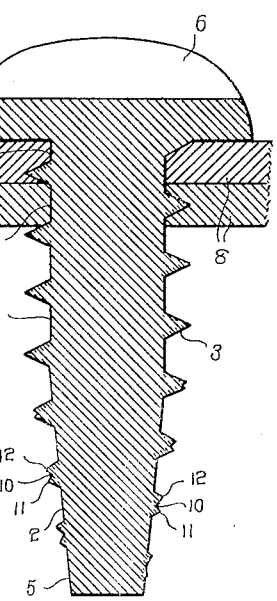

Figure 3 is a longitudinal, vertical, central section taken on the plane indicated by line 3—3 of Figure 2, and Figures 4, 5, and 6 are views similar, respectively, to Figures 1, 2, and 3 of an embodiment omitting the groove in the thread.

Referring to the drawings by numerals, 1 indicates the body or root diameter of a screw having a tapered entering portion 2 which is truncated and thus presents the form of a truncated cone from the main portion of the body 1 to the entering end. The main part of said body is cylindrical and of substantially constant cross sectional area to the place of the beginning of the taper 2. It will be understood, of course, that, as illustrated, the body 1 is idealized by the draftsman, but, since the screw is intended to be a rolled thread product, variations from a perfect cylinder for the body may occur and the spiral valley lying between the helices of the thread 3 will not always have a flat base. Such variations are to be understood to be within the purview of conditions of regular manufacture. The thread 3 throughout the main body 1 is of full depth and of the pitch and form ordinarily employed in conjunction with screws commonly known as wood screws, so that the pitch is of wider angle or higher pitch than that of machine screws or bolts, but, again, variation may readily occur in the degree of pitch without variation from the present invention. At about the place in the length of the body 1 where the taper 2 begins, the thread 3 also begins to taper, that is to be reduced in its outstanding width or depth, and said thread is thus tapered down to a point 4 where it blends into the tapering portion 2 of body 1 above the terminus thereof, whereby an entering or guide portion or pilot 5 is produced. It is to be observed also that that part of thread 3 which spirals about the tapering portion 2 of the body 1 is of such angle of pitch that the full depth thread on the main body 1 will track with respect to the tapering part of the thread, so that there is a slight difference in the angle of the tapering portion of the thread from the non-tapering portion to compensate for the constantly varying cross sectional area of the tapering portion 2. The taper of the body which forms pilot 5 is of a different character from the burrowing point of an ordinary gimlet-tipped screw or like tapered screw, the taper of the pilot being only very slight and sufficient for guiding the screw in its insertion in a preformed opening in metal or like work. The taper of the pilot is not intended for burrowing and is, therefore, sufficiently slight to prevent the screw from canting or assuming an inclined relation to the surface of the work when being inserted, the piloting taper at the same time greatly facilitating introduction of the screw into the work. It should also be observed that, among other things in the way of natural departure during manufacture from the idealized showing in the accompanying drawings, variations in the relative location of the tapered portion of the thread in its relation to the tapering pilot will be practiced, but of course the taper of the thread and of the pilot must be such as to cooperate in facilitating entry in work independently of the idea of burrowing.

As will be seen from the dot and dash line A of Figure 1, the inclination of the tapered portion 2 with respect to the longitudinal axis is less than the inclination of a hollow cone that might be fitted over the tapered portion of the tapering thread, the inclination of the wall of such hollow cone being indicated by the dot and dash line B. Thus, the tapering thread, considered as a unit represented by the hollow cone, presents a taper possessing an inclination which causes it to reach an apex, as indicated by the line B, before an apex would be reached by or incident to the inclination of the taper of the truncated cone 2. This arises from the fact that the thread must taper more rapidly than the taper of the entering portion 2 in order to permit the thread to blend into said portion 2 before reaching the terminus of portion 2. Of course, variations in the character of taper both of the thread and of the tapering pilot are available so long as the taper is not of such a character as to occasion canting of the screw when the same is being inserted and is not such as is especially adapted for burrowing into work.

The pinlike body comprising the root diameter 1 is preferably provided with the usual head 6, having the screw-driver receiving kerf 7, and the thread 3 is preferably hardened to a degree sufficient for cutting or entering work, such as metal exemplified as ordinary soft iron or soft steel, substantially without injury to the thread. This hardening may be accomplished in any of various well known ways, as, by the known cyaniding process of case-hardening. For the saving of expense and practical commercial purposes, the entire screw structure is case-hardened, but it is important to observe that undue hardening of the body or root diameter is avoided, and it is only essential that the thread itself should be hardened. The hardened condition is indicated in Figure 3 of the drawings.

The improved screw is adapted for any type of work to which my structure of the above-identified co-pending application is adapted, and the work illustrated is only one of many forms appropriate to be fastened by embodiments of the present invention. As shown, the work consists of sheets 8, 8 of metal or other material, which were first penetrated by a bore 9 and then engaged by the screw. The bore 9 may be made in any acceptable commercial manner, as by punching or boring, and the diameter of the bore 9 is preferably the same or slightly less than that of body 1. Since the body 1 is of greater cross sectional area than the cross sectional area of the entering helix of the tapering portion of the thread, it will be obvious that the operator may insert the entering end and press the screw in the opening 9 as far as permitted by the ever increasing diameter of the tapering thread. The distance is sufficient to allow parts of the thread to engage the side walls of the bore 9 and to slightly enter the material of the work, so that, as soon as the screw is revolved, the threads begin to exert a pull, drawing the screw inward, and in so doing causing the oncoming portions of thread to enter farther and farther into the material. There is a decided advantage in this action both in facilitating the finding of the opening 9 by the truncated portion or pilot 5 and by the ease with which the screw takes into the work. The operator finds it possible to apply and screw home many more screws in a given time, when constructed as illustrated, than when the body 1 is constant to the entering end.

The groove 10 formed along the edge of the tapering portion of the thread divides the tapering portion into two cutting edges 11 and 12 which function largely as do the corresponding edges produced by the corresponding groove in the thread of the structure seen in my said co-pending application, except that the groove 10 does not enter the body 1 and the fact of the taper 2 causes the edge 11 to be in every instance nearer to the surface of the tapering portion 2 than the edge 12 and nearer than it would be if the portion 2 were constant or cylindrical instead of tapering. In the structure shown in my said co-pending application the fact that the entering portion of the thread is tapered causes the inner or lower edge formed by the groove in the thread to be slightly nearer the surface of the body portion than the upper or outer edge, but such difference is much slighter than in the present invention, since the difference is that incident to the taper in the width of the thread of said co-pending application; whereas in the present invention the difference is due both to the taper of the thread and the taper of the body portion. Facility for lateral gripping of work is thus enhanced by the present invention.

It should also be borne in mind that the present invention distinguishes from the ordinary gimlet tipped screw in that the gimlet tipped screw has no means in and of itself to prevent skewing or canting in being applied; whereas the pilot 5 helps materially to locate the aperture 9 in the first instance, and then serves effectively to prevent any appreciable canting of the screw as it enters.

The preferred mode of application and the advantages thereof of a structure embodying the features of the present invention is indicated by the dotted line position of the work in Figure 2. The screw-threaded fastener is merely inserted in the aperture 9 manually or dropped in position by automatic machinery until it reaches the location indicated by said dotted line showing. In this position, a substantial length of edges 11 and 12 will be in contact with the surrounding wall of the work, and while a slight amount of axially directed or longitudinal pressure will ordinarily be applied, the bite of the contacting edges 11 and 12 against the wall of the work will be such as to readily lead in the approaching portions of the thread with the revolution of the screw. Furthermore, though the tapering portion of the screw allows the entering end to thus enter the work for a substantial distance, there will be little or no tendency to rock or cant to a skewed position in view of the engagement of a substantial extent of the edges 11 and 12 with the surrounding walls. Thus, the screw, as above indicated, is capable of being inserted and forced to its seated position practically solely by the use of torsional stress, as by the employment of a screw-driver or other instrument for rotating the screw, but, of course, the very application of the rotating instrument will contribute some longitudinal stress tending to aid in the gripping action of the thread in the work, but no such pressure will be required as is necessary when a thread must be initially forced into the work from the exterior surface thereof. Rotation of the screw is continued from the position where the relation of the screw to the work is that indicated by the dotted line position of the work in Figure 2 to the position shown by the full line location of the work. For the saving of space, the positions of the parts have been indicated as if the work had been moved, and while this may occur, it will usually be the screw which moves longitudinally with respect to the work rather than the work move relative to the screw.

Figure 4:
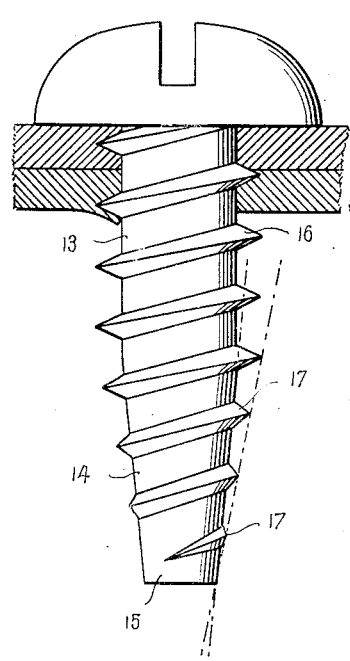
Figure 5:
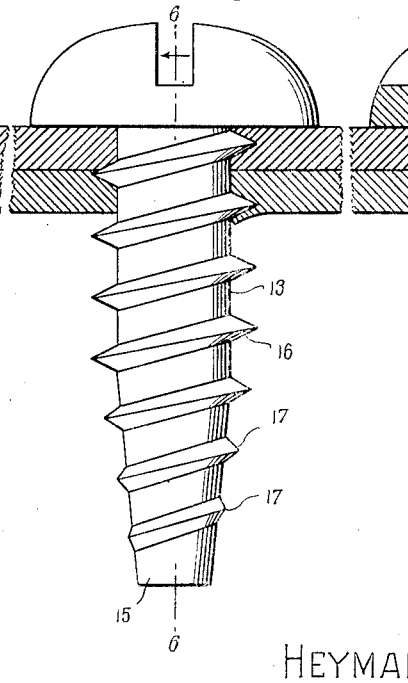
Figure 6:
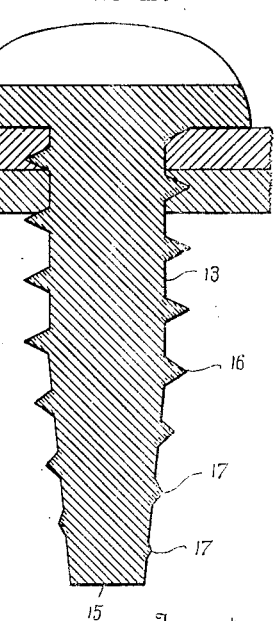

In Figures 4, 5, and 6, I have illustrated the invention as applied to a screw whose thread is not grooved at the entering end. Otherwise, the structure shown in Figures 4, 5, and 6 corresponds exactly with the structure seen in Figures 1, 2, and 3. Briefly, the structure consists of a pinlike body 13 of constant diameter or cylindrical form blending into a conical or tapered portion 14 truncated and provided with a pilot 15, the body portion having the usual screw thread 16 of full depth throughout the length of the cylindrical portion 13 and of constantly diminishing depth, as at 17, throughout the tapering portion 14 until the entering terminus of the thread blends into the root diameter.

There are numerous modes of satisfactorily and advantageously utilizing embodiments of the present invention additional to those illustrated and described as will become immediately apparent to those skilled in the industrial art to which the present invention appertains.

In addition to my co-pending application Serial No. 124,454, filed July 23, 1926, and patented as aforesaid reference is also made to my co-pending application Serial No. 242,984, filed December 28, 1927, and covering improvements in fastening devices, in which is shown a cylindrical body or root diameter of constant cross sectional area having a thread outstanding a definite and constant distance for a certain length and thence tapering toward the entering end of the body portion, but the fact that the structure of the last-mentioned co-pending application includes a body portion of substantially cylindrical form necessitates the formation of an opening in work of greater diameter than the diameter of the body or root diameter to enable the tapered thread to engage with the surrounding wall of the work when initially introduced. By the invention of this present application, the opening in the work may be made only of the size of the diameter of that portion of the body which is substantially cylindrical, and the entering, tapered end will permit advantageous introduction into such opening while insuring effective contact of material of the work against the main portion of said body without depending upon the flow of material to effect this result, and at the same time insuring greater compactness of material of the work incident to the flow caused by entrance of the thread into the material of the work.

What I claim is:—

1. A screw-threaded fastener for use in metal work comprising a substantially cylindrical body and a thread outstanding therefrom, a portion of said thread being of constant or uniform outstanding depth, and the entering end portion of the thread tapering in the sense of constantly narrowing in the dimension of outstanding depth, and the body having a piloting taper at its entering end onto which the tapered portion of the thread extends, the tapering of the piloting taper being only sufficient to facilitate and guide positioning in a pre-formed opening in work and insufficient for endangering canting in being inserted in work.

2. A screw-threaded fastener as claimed in claim 1 having the tapering thread extending a substantial distance along the piloting taper including at least a full helix of the tapering thread.

3. A screw-threaded fastener as claimed in claim 1, in which the entering portion of the thread is formed with a longitudinal groove.

4. A screw-threaded fastener for use in metal work as claimed in claim 1, wherein the terminus of the tapering pilot is formed abrupt to present a truncated cone entering end.

5. A screw-threaded fastener for use in metal work comprising a substantially cylindrical body having a slightly tapering, non-burrowing pilot portion at its entering end, and a thread outstanding from the body and extending substantially throughout the length of the body, the main portion of said thread being of constant or uniform outstanding depth, and the entering portion of the thread tapering along the body toward the entering end of the body for a substantial distance, the taper of the thread being in the sense of constantly narrowing in the dimension of outstanding depth, the taper of the pilot and of the thread being of such character as to cooperate and adapt the pilot and thread to guide and facilitate positioning of the fastener in a pre-formed opening in work and being insufficient to endanger canting during such positioning.

In testimony whereof I affix my signature.

HEYMAN ROSENBERG.